United States Patent
Raman et al.

(10) Patent No.: US 9,906,440 B2
(45) Date of Patent: Feb. 27, 2018

(54) ARBITRATING AND MULTIPLEXING CIRCUITRY

(71) Applicant: ARM LIMITED, Cambridge (GB)

(72) Inventors: Rakesh Raman, Sheffield (GB); Andrew David Tune, Sheffield (GB); Guanghui Geng, Sheffield (GB)

(73) Assignee: ARM Limited, Cambridge (GB)

( * ) Notice: Subject to any disclaimer, the term of this patent is extended or adjusted under 35 U.S.C. 154(b) by 294 days.

(21) Appl. No.: 14/734,367

(22) Filed: Jun. 9, 2015

(65) Prior Publication Data

US 2016/0014050 A1   Jan. 14, 2016

(30) Foreign Application Priority Data

Jul. 8, 2014   (GB) .................................. 1412140.4

(51) Int. Cl.
*H04L 12/937* (2013.01)
*H04L 12/753* (2013.01)
*G06F 13/14* (2006.01)

(52) U.S. Cl.
CPC .............. *H04L 45/48* (2013.01); *G06F 13/14* (2013.01)

(58) Field of Classification Search
CPC ............................... H04L 49/254; H04L 45/48
See application file for complete search history.

(56) References Cited

U.S. PATENT DOCUMENTS 5,832,278 A * 11/1998 Pham .................... G06F 13/364
710/111

OTHER PUBLICATIONS

U.S. Appl. No. 15/273,932, filed Sep. 23, 2016, Inventor: Tune et al.
D. Harris, "A Taxonomy of Parallel Prefix Networks", *Signals, Systems and Computers Conference*, vol. 2, Nov. 9-12, 2003, pp. 2213-2217.
P. Kogge and H. Stone, "A Parallel Algorithm for the Efficient Solution of a General Class of Recurrence Equations", *IEEE Transactions on Computers*, vol. C-22, No. 8, Aug. 1973, pp. 786-793.
G. Dimitrakopoulos et al, "Fast Arbiters for On-Chip Network Switches" IEEE International Conference on Computer Design, ICCD 2008, Nov. 2008, pp. 664-670.
Search Report for GB1412140.4 dated Jan. 12, 2015, three pages.
G. Dimitrakopoulos, Dynamic-Priority Arbiter and Multiplexer Soft Macros for On-Chip Network Switches, *EDAA*, Mar. 12, 2012, four pages.
G. Dimitrakopoulos et al., "Scalable arbiters and multiplexers for on-FGPA interconnection networks", Sep. 5, 2011, seven pages.

* cited by examiner

Primary Examiner — Jamal Javaid
(74) Attorney, Agent, or Firm — Nixon & Vanderhye P.C.

(57) ABSTRACT

Arbitrating and multiplexing circuitry 28 comprises arbitrating tree circuitry having X arbitrating levels and multiplexing tree circuitry having Y multiplexing levels. The Y multiplexing levels comprise a first set of multiplexing levels upstream of a second set of multiplexing levels. The first set of multiplexing levels operate in parallel with at least some of the arbitrating levels. The second set of multiplexing levels operate in series with the X arbitrating levels such that the second set of multiplexing levels completes the required selection to provide the final output following completion of, and in dependence upon, the arbitration by the arbitrating tree circuitry.

19 Claims, 7 Drawing Sheets

ARBITRATING AND MULTIPLEXING CIRCUITRY

This application claims priority to GB Patent Application No. 1412140.4 filed 8 Jul. 2014, the entire content of which is hereby incorporated by reference.

BACKGROUND

Field

This disclosure relates to the field of data processing systems. More particularly, this disclosure relates to arbitrating and multiplexing circuitry for performing an arbitration between a plurality of inputs and a selection of at least one of the plurality of inputs to provide an output.

Description

Figure 1:
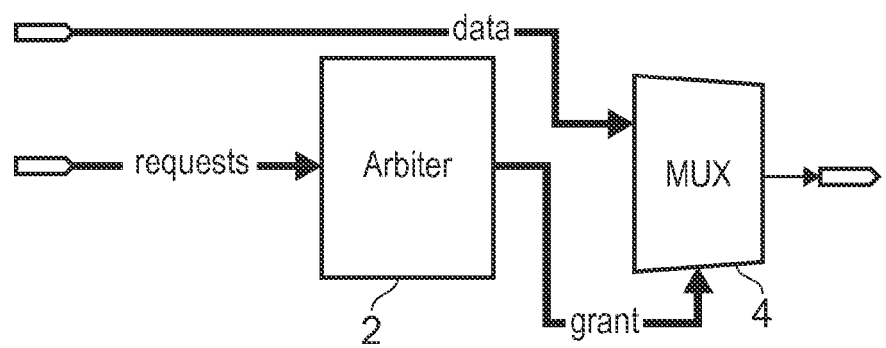

It is known to provide arbitrating and multiplexing circuitry. One known form of arbitrating and multiplexing circuitry is as illustrated in FIG. 1 of the accompanying drawings. In this example, an arbiter 2 is disposed in series with a multiplexer 4. The arbiter 2 receives a plurality of requests indicating which inputs are carrying data between which an arbitration is required. The arbiter 2 performs an arbitration in accordance with whatever arbitration algorithm is being employed, and generates a grant signal to select one of the inputs. The grant signal is supplied to the multiplexer 4 and controls the multiplexer 4 to select the appropriate input to serve as the output from the multiplexer 4. The processing delay associated with the action of the circuitry of FIG. 1 is to least the time taken for the arbiter 2 to perform the arbitration operation summed with the time taken for the multiplexer 4 to perform the selection operation in response to the grant signal generated by the arbiter 2 after it has finished its arbitration.

The time taken for the serially performed arbitration and multiplexing operations of the circuitry of FIG. 1 may be a limitation in system performance, e.g. may limit clock frequency and/or require the operation to be spread over multiple clock cycles in a manner which increases latency, etc.

SUMMARY

At least some example embodiments of the disclosure provide arbitrating and multiplexing circuitry for performing an arbitration between a plurality of inputs and a selection of at least one of said plurality of inputs to provide an output, said arbitrating and multiplexing circuitry comprising:

arbitrating tree circuitry having X arbitrating levels, where X is an integer greater than one; and multiplexing tree circuitry having Y multiplexing levels, where Y is an integer greater than one; wherein (i) said Y multiplexing levels comprise a first set of said multiplexing levels upstream of a second set of said multiplexing levels;

(ii) said first set of said multiplexing levels is configured to operate in parallel with at least some of said X arbitrating levels, whereby said first set of multiplexing levels is configured to perform a partial selection in parallel with said arbitration performed by said X arbitrating levels; and (iii) said second set of said multiplexing levels is configured to operate in series with said X arbitrating levels, whereby said second set of multiplexing levels completes said selection to provide said output following completion of and in dependence upon said arbitration.

At least some further example embodiments of the disclosure provide arbitrating and multiplexing circuitry for performing an arbitration between a plurality of inputs and a selection of at least one of said plurality of inputs to provide an output, said arbitrating and multiplexing circuitry comprising:

arbitrating tree means for performing said arbitration, said arbitrating tree means having X arbitrating levels, where X is an integer greater than one; and multiplexing tree means for performing said selection, said multiplexing tree means having Y multiplexing levels, where Y is an integer greater than one; wherein (i) said Y multiplexing levels comprise a first set of said multiplexing levels upstream of a second set of said multiplexing levels;

(ii) said first set of said multiplexing levels is configured to operate in parallel with at least some of said X arbitrating levels, whereby said first set of multiplexing levels is configured to perform a partial selection in parallel with said arbitration performed by said X arbitrating levels; and (iii) said second set of said multiplexing levels is configured to operate in series with said X arbitrating levels, whereby said second set of multiplexing levels completes said selection to provide said output following completion of and in dependence upon said arbitration.

At least some further example embodiments of the disclosure provide a method of arbitrating and multiplexing to perform an arbitration between a plurality of inputs and a selection of at least one of said plurality of inputs to provide an output, said method comprising the steps of:

performing said arbitration with arbitration tree circuitry, said arbitrating tree circuitry having X arbitrating levels, where X is an integer greater than one; and performing said selection with multiplexing tree circuitry, said multiplexing tree circuitry having Y multiplexing levels, where Y is an integer greater than one; wherein (i) said Y multiplexing levels comprise a first set of said multiplexing levels upstream of a second set of said multiplexing levels;

(ii) said first set of said multiplexing levels operates in parallel with at least some of said X arbitrating levels, whereby said first set of multiplexing levels performs a partial selection in parallel with said arbitration performed by said X arbitrating levels; and (iii) said second set of said multiplexing levels operates in series with said X arbitrating levels, whereby said second set of multiplexing levels completes said selection to provide said output following completion of and in dependence upon said arbitration.

The above, and other objects, features and advantages of this disclosure will be apparent from the following detailed description of illustrative embodiments which is to be read in connection with the accompanying drawings.

DRAWINGS

Figure 2:
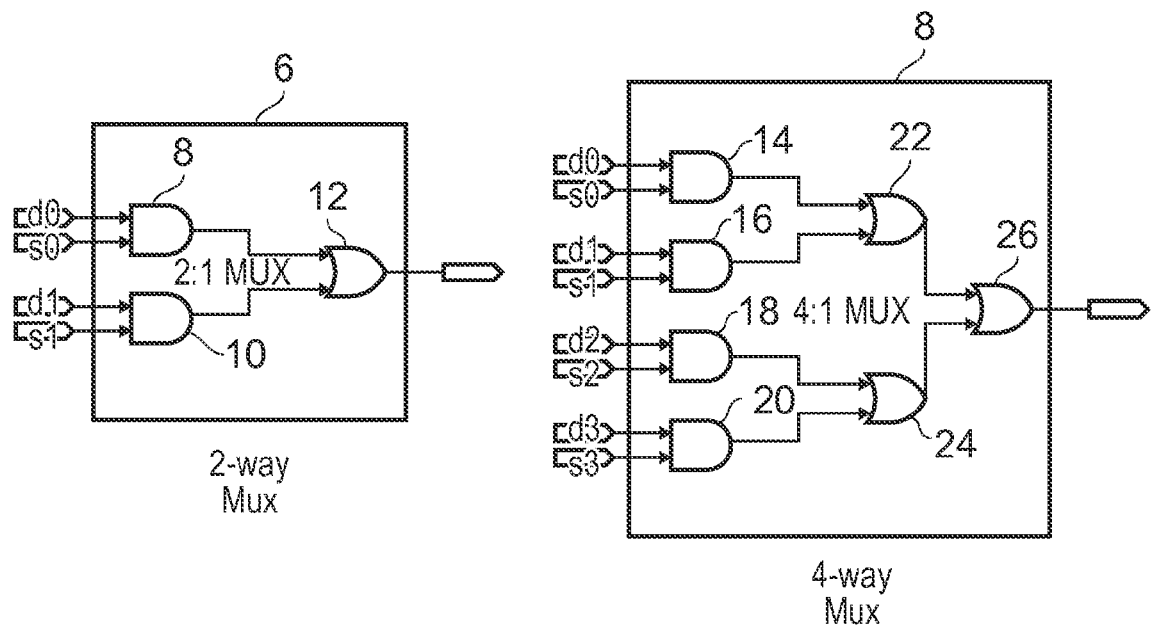
Figure 3:
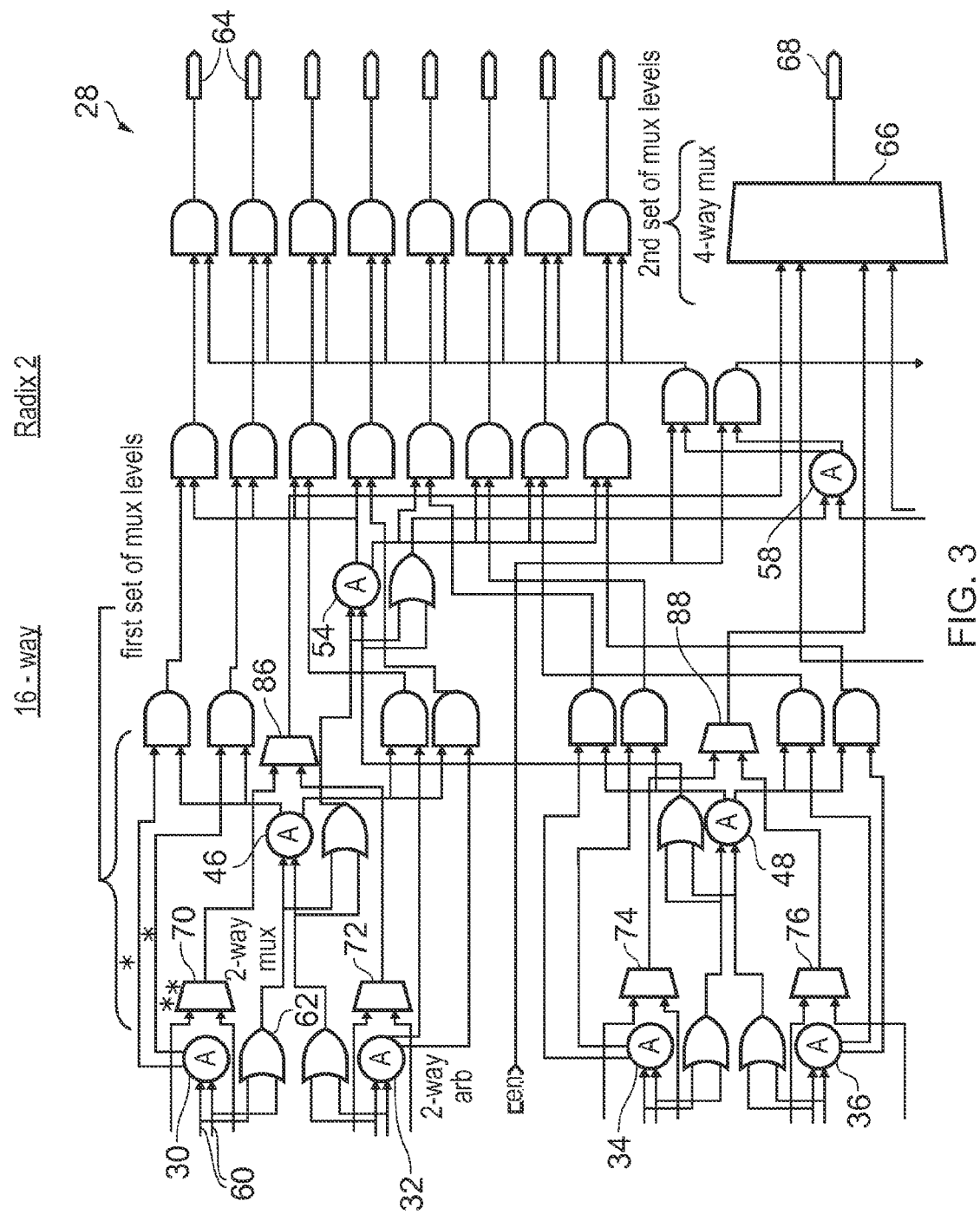
Figure 3:
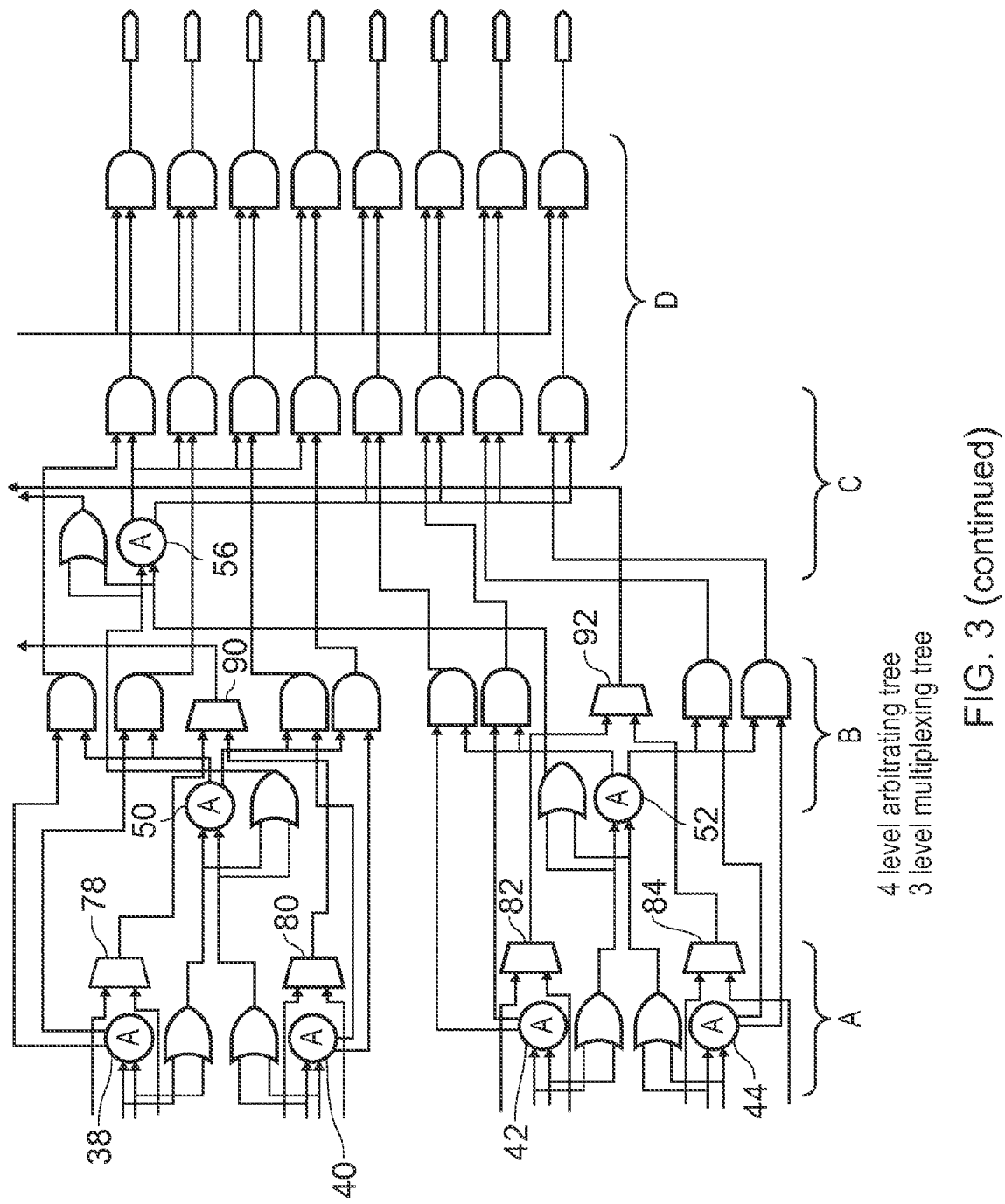
Figure 4:
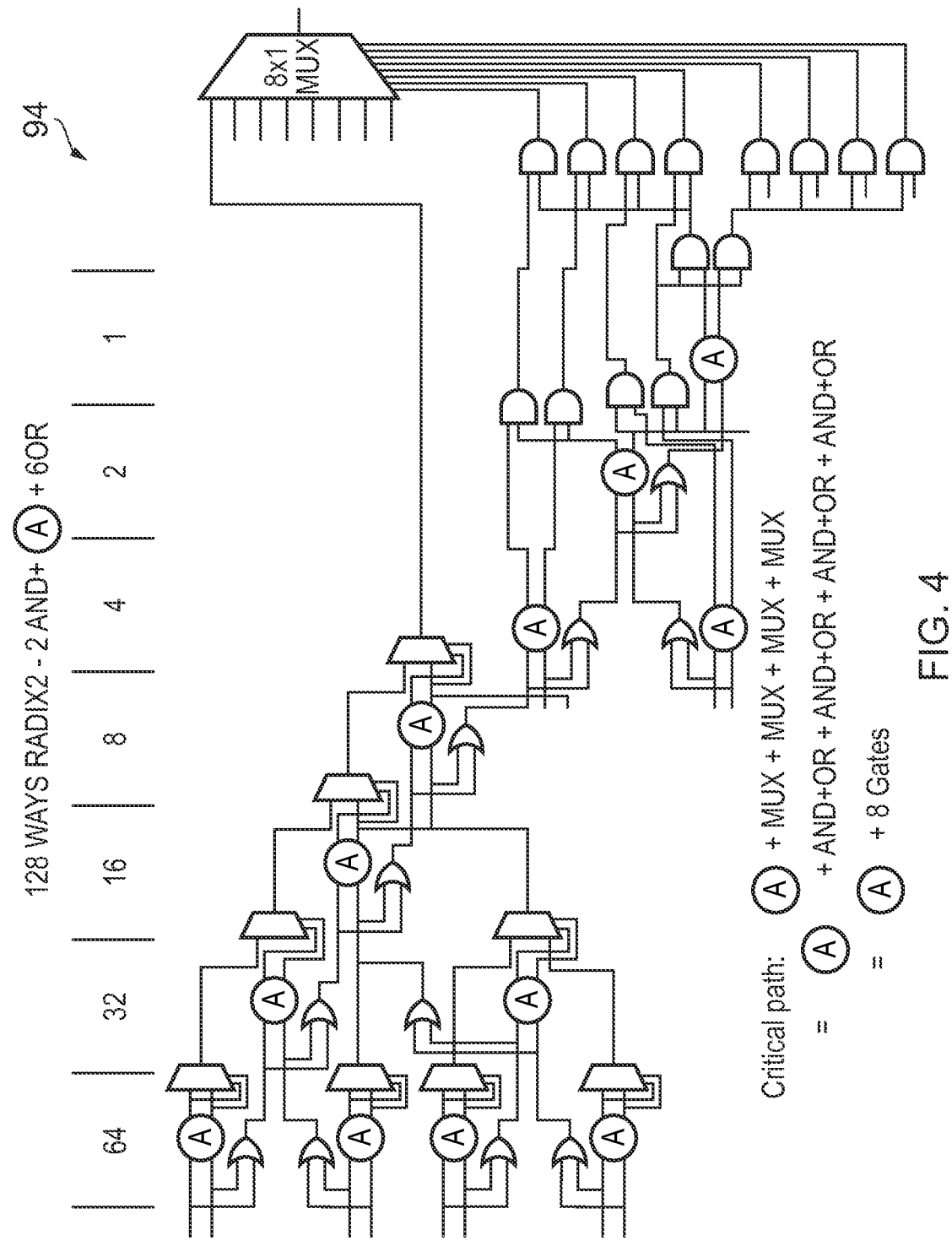
Figure 5:
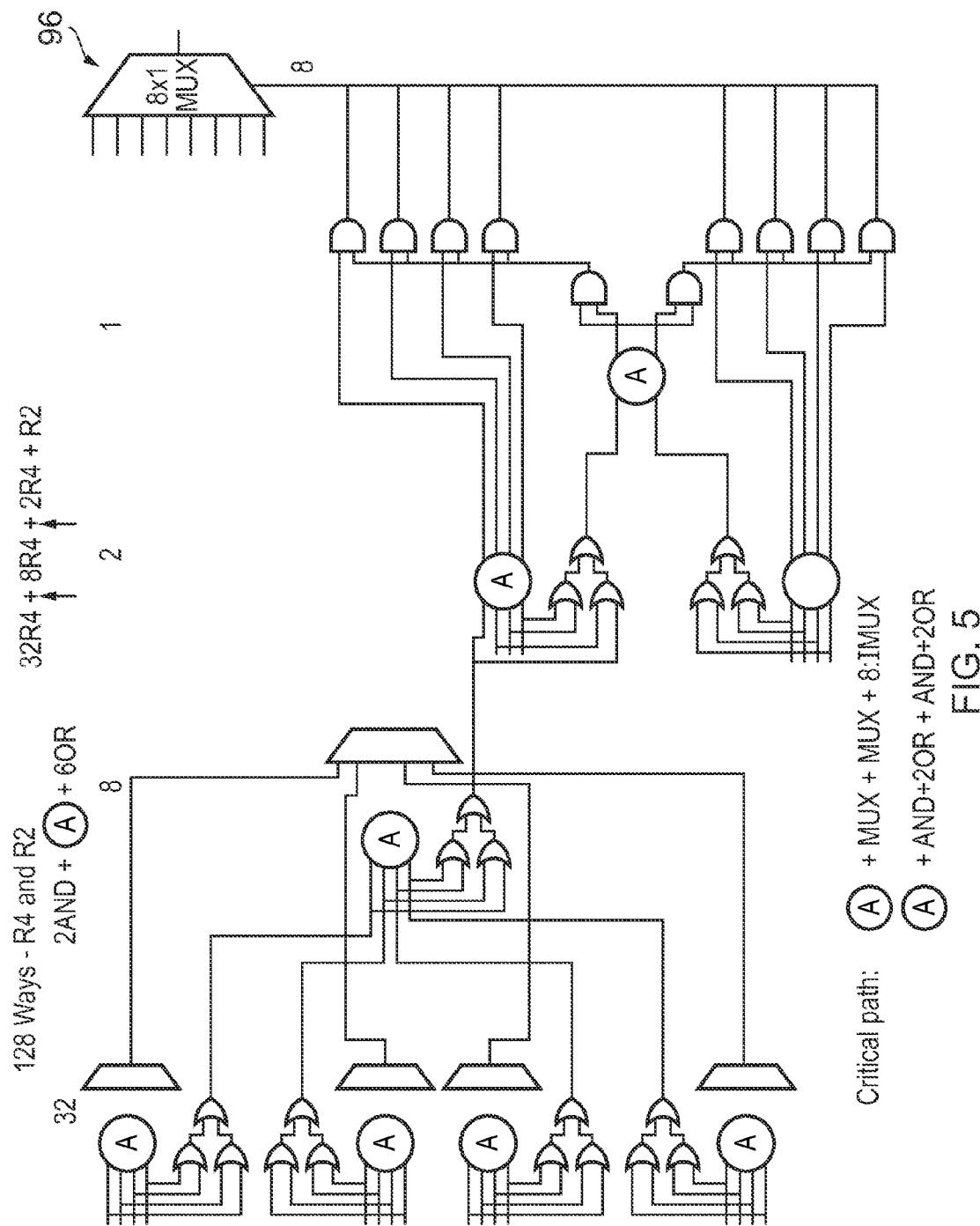
Figure 6:
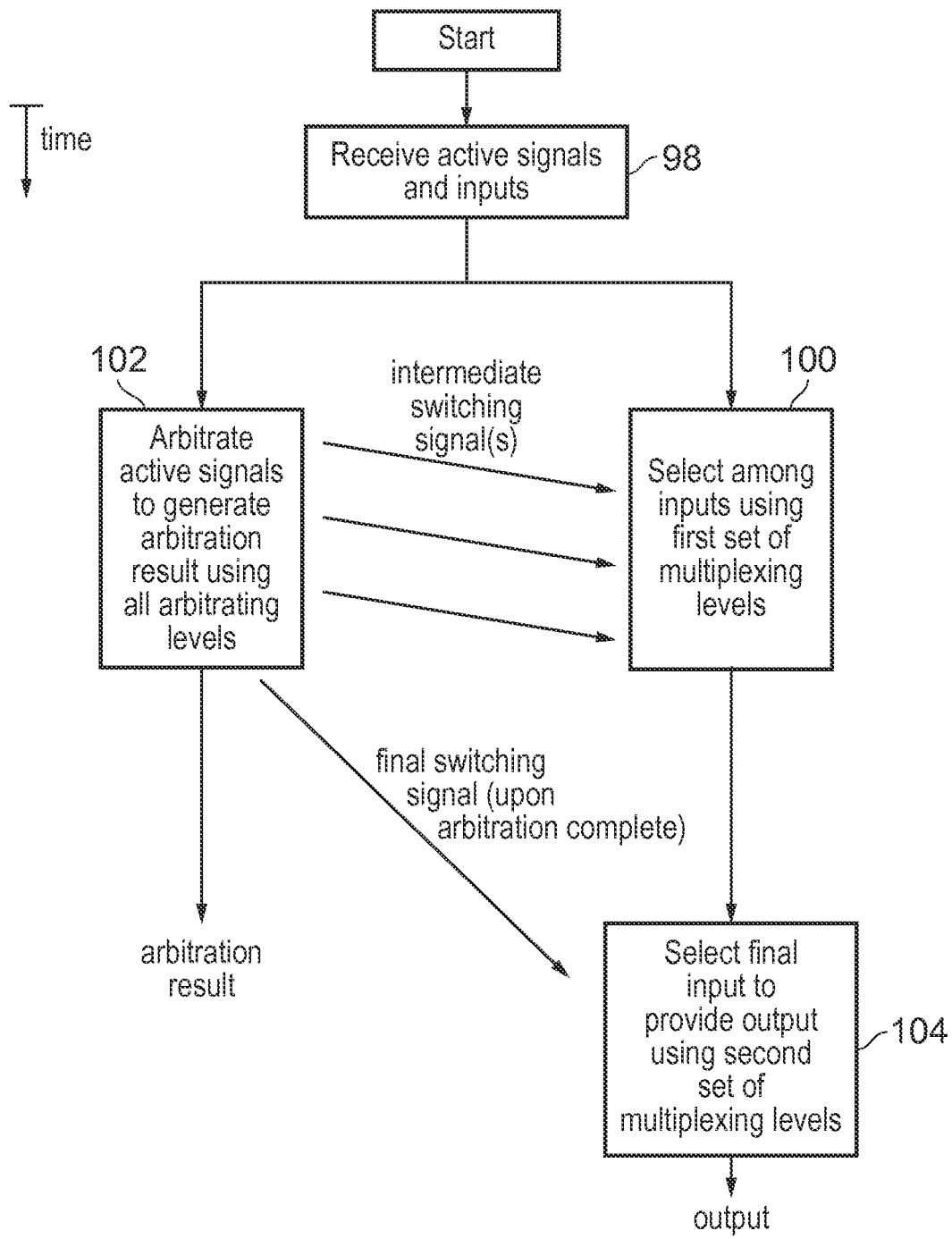
Figure 7:
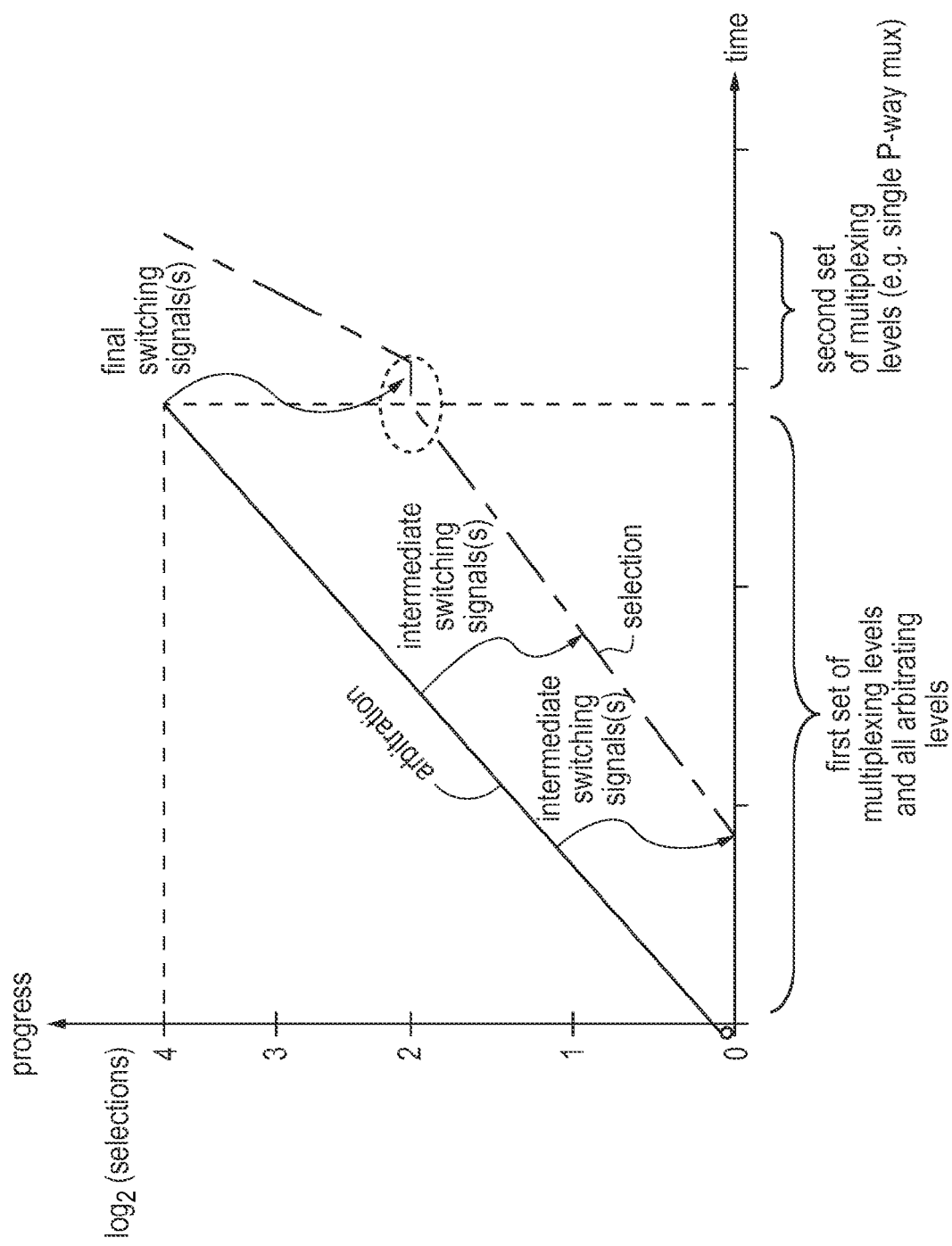

FIG. 1 schematically illustrates an arbiter in series with a multiplexer;

FIG. 2 schematically illustrates the logic depth of multiplexers of different widths;

FIG. 3 schematically illustrates a first example embodiment of arbitrating and multiplexing circuitry;

FIG. 4 schematically illustrates a second example embodiment of arbitrating and multiplexing circuitry;

FIG. 5 schematically illustrates a third example embodiment of arbitrating and multiplexing circuitry;

FIG. 6 is a flow diagram schematically illustrating the operation of the embodiments of FIGS. 3, 4 and 5; and FIG. 7 is a diagram schematically illustrating the parallel operation of the multiplexing tree and the arbitrating tree followed by a final multiplexing operation

EMBODIMENTS

The present technique recognises that the arbitrating and multiplexing circuitry can be made faster and more efficient by partially operating the multiplexing tree in parallel with the arbitrating tree. This can reduce the width of the final multiplexing required once the arbitration has been completed, with the first stages of the multiplexing operation being "hidden" from a timing perspective in parallel with the arbitrating tree. The use of the present technique will tend to make the gate depth of the multiplexing tree as a whole greater in a manner which would normally be considered to prejudice the worker in this field against such an approach, but the present technique recognises that enough of this deeper multiplexing tree may be hidden in parallel with the operation of the arbitrating tree that an overall increase in speed and efficiency may be gained.

In some example embodiments, Y is less than X indicating that the multiplexing tree has fewer levels than the arbitrating tree. More specifically, in some example embodiments the first set of multiplexing levels contains a number of levels that is the smallest integer greater than or equal to X/2. The final multiplexing performed after the arbitration has completed may be performed in a single multiplexer level and it has been found that in practice the multiplexing levels performed in parallel with the arbitration tree are balanced with each other in time when there are substantially half the number of multiplexing levels within the first set of multiplexing levels which are performed in parallel with the arbitrating tree performing its arbitration.

In some embodiments the single multiplexing level which forms the second set of multiplexing levels may comprise a final multiplexer switched by a final switching signal generated upon completion of the arbitration. This final switching signal may not represent directly the arbitration result generated, but it does require the full arbitration to have been completed in order that the final switching signal has a defined value which may be used to control the final multiplexer.

The final multiplexer may be a P-way multiplexer. This P-way multiplexer may be wider than the multiplexers employed within the first set of multiplexing levels which are operating in parallel with the arbitration tree circuitry. The multiplexers which operate in a parallel with the arbitration tree circuitry (i.e. within the first set of multiplexing levels) may be Q-way multiplexers. Some efficient embodiments employ 4-way multiplexers as these are suited to the characteristics of the transistors which are typically used to implement such multiplexers.

The Q-way multiplexers within the multiplexing levels of the first set may be switched by respective and intermediate switching signals generated prior to the completion of the arbitration. The arbitrating levels within the arbitrating tree circuitry may generate these intermediate switching signals when the arbitration is partially performed and accordingly allow the selection to be partially performed prior to the end of the arbitration, and the final determination of the actual individual or group of inputs that need to be selected.

In some embodiments, the X arbitrating levels may comprise a plurality of Q-way arbiters. Matching the width of the arbiters to the width of the multiplexers within the portions of the arbitrating tree circuitry and the multiplexing tree circuitry which operate in parallel simplifies the generation of the intermediate switching signals and allows the Q-way arbiters to control a respective Q-way multiplexer in a direct and efficient manner.

The width of the various multiplexers and arbiters could vary. Some efficient example implementations use widths which are a power of two and in particular use a width of four as previously mentioned.

If a value of R is $\log_2$ of the width of the arbiters and multiplexers operating in parallel, then in some efficient embodiments, the Q-way multiplexers have a logic depth corresponding to one AND gate and R OR gates.

While wider multiplexers are generally more efficient in terms of the logic depth they consume relative to the degree (radix) of multiplexing they perform, the present technique recognises that narrower, and consequently less efficient multiplexers, may be hidden in parallel with the operation of the arbitrating tree circuitry while the final multiplexer may be made wider and more efficient. In particular, the final P-way multiplexer may have a logic depth corresponding to one AND gate and S OR gates were S is the smallest integer value that is equal to or greater than $\log_2(P)$.

In some example embodiments, the arbitrating and multiplexing circuitry may be arranged such that each of the plurality of inputs has a corresponding active signal indicating that it is active and should be subject to arbitration. Within this context, the arbitrating tree circuitry may be arranged such that it fully performs the arbitration in direct dependence upon the plurality of active signals. Accordingly, the active signals presented to the arbitrating and multiplexing circuitry do not require any pre-processing or other manipulation in order that the operation of the arbitrating and multiplexing circuitry may commence. This reduces the latency of the arbitrating and multiplexing circuitry.

It will be appreciated that the arbitration performed may be based upon a variety of different algorithms. For example, the arbitration may be performed based on a pseudo least recently used algorithm, a least recently used algorithm, a fair arbitration algorithm (e.g. such as is described in published patent application US-A-2013/0318270, the content of which is incorporated herein in by reference (e.g. the description of a weakly fair arbitration algorithm and it implementation)) or a random algorithm. The arbitrating tree circuitry may be configured to also generate an arbitration result signal upon completion of the arbitration. This arbitration result signal may indicate which of the plurality of inputs was selected to provide the output. Such an arbitration result signal may, for example, be used to acknowledge to the source of the input signals that they have been selected and accordingly may be de-asserted.

FIG. 2 schematically illustrates example embodiments of a two-way multiplexer 6 and a four-way multiplexer 8. As can be seen, the two-way multiplexer 6 comprises a first level of AND gates 8, 10 followed by a second level of an OR gate 12. Accordingly, the logical depth of the two-way multiplexer 6 is one AND gate 8, 10 and one OR gate 12.

The four-way multiplexer 8 comprises a first level of AND gates 14, 16, 18, 20 followed by two levels of OR gates 22, 24, 26. The logical depth of the four-way multiplexer is one AND gate 14, 16, 18, 20 and two OR gates 22, 24, 26. It will be appreciated that as the radix of the multiplexer successively doubles beyond the four-way multiplexer 8, the number of levels of OR gates 22, 24, 26 increases by one each time, but only a single level of AND gates 14, 16, 18, 20 remains required. Thus, it is more efficient (quicker) in terms of operating speed to utilise fewer higher radix multiplexers rather than a greater number of levels of lower radix multiplexers connected in series.

FIG. 3 schematically illustrates a first example embodiment of arbitrating and multiplexing circuitry 28. This arbitrating and multiplexing circuitry 28 includes an arbitrating tree circuitry including the arbiters 30, 32, 34, 36, 38, 40, 42, 44, 46, 48, 50, 52, 54, 56 and 58. Each of these is a radix two arbiter. The arbiters 30 to 58 are arranged as a four level arbitrating tree circuitry. Each level of the arbiters receives its input from the ready signals 60 passed via a sequence of OR gates 62. Accordingly, the arbitration at any given level does not need to wait until the arbitration at a preceding level has completed, rather it need only wait until the ready signals 60 have propagated in modified form to that arbitration level via the intervening OR gates 62. The full arbitration tree circuitry comprises sequentially levels A, B, C and D as marked. The result of the final arbitration when completed generates an arbitration result as a one-hot signal upon the outputs 64.

The outputs from the arbiters 54, 56 and 58 are combined via AND gates (not shown) to generate a one-hot final selecting signal supplied to a final multiplexer 66 which serves to output the selected output 68 when the final level of multiplexing has been completed. The final multiplexer 66 does not perform its selection until after the arbitration has been completed, and it is supplied with the final switching signal which is dependent upon the final level of arbitration performed by arbiter 58.

As will be seen in this example embodiment, in parallel with the arbitration levels A and B are disposed multiplexing levels comprising multiplexers 70, 72, 74, 76, 78, 80, 82, 84, 86, 88, 90 and 92. Each of these multiplexers 70 to 92 comprises a two-way multiplexer, i.e. has the same radix as the associated arbiter 30 to 52 which is illustrated proximal to it and which generates the corresponding intermediate switching signal for switching its associated multiplexer 70 to 92.

In the example illustrated, the arbitrating tree circuitry has four arbitrating levels and accordingly X=4. The multiplexing tree circuitry has three multiplexing levels and accordingly Y=3. The multiplexing tree circuitry is split into a first set of multiplexing levels comprising the multiplexers 70 to 92 (i.e. two levels) and a second set of multiplexing levels comprising the final multiplexer 66 (namely one level of multiplexing). The first set of multiplexing levels, including multiplexers 70 to 92, operates and performs its partial selection in parallel with the operation of the four levels of the arbitrating tree circuitry. The multiplexing levels are slower (logically deeper) than the arbitrating levels and accordingly the output of the first set of multiplexing levels is timed to be available at approximately the same time as the result of the arbitration is completed. The result of the arbitration can then be used to provide the final switching signal to the final multiplexer 66 (second set of multiplexing levels). The second set of multiplexing levels completes the selection and generates the output 68. This final selection follows completion of and is dependent upon the arbitration which is completed in advance of the selection performed by the second set of multiplexing levels.

The balancing of the speed of operation of the first set of multiplexing levels with the speed of operation of the arbitrating tree circuitry may, in some example embodiments, be undertaken so that a maximum number of multiplexing levels (may be hidden in respect of timing) operate in parallel with the arbitration without the arbitration finishing significantly before the partial selection. Thus, when the arbitration finishes and the arbitration result is available in order to perform the final selection, the partial multiplexing will already have been performed (or will nearly have finished) and the final multiplexer 66 may be switched. As the final multiplexer 66 is able to be narrower due to the partial multiplexing which has already taken place, the logical depth of the final multiplexer 66 is less than if the full level of multiplexing was required to be performed subsequent to the arbitration being completed (e.g. as in FIG. 1). Accordingly, the overall time taken to complete both the arbitration and the selection may be reduced. A good balance between the speed of operation of the first set of multiplexing levels and the arbitration tree circuitry has been found to be when the number of levels within the first set of multiplexing levels is half that of the number of levels in the arbitrating tree circuitry e.g. the number of levels in the first set is the smallest integer greater than or equal to half the number of levels in the arbitrating tree circuitry.

While the example of FIG. 3 uses radix two arbiters and multiplexers, in some other embodiments, radix four multiplexers and arbiters may be used as giving a better balance between logical depth and ready implementation.

The arbitration which is performed by the arbiters 30 to 58 can be performed in accordance with a variety of different arbitration algorithms. For example, these algorithms may include a pseudo least recently used algorithm, a least recently used algorithm, a fair arbitration algorithm and a random algorithm. A weakly fair arbitration algorithm is an example of a fair arbitration algorithm and such a weekly fair arbitration algorithm is described in the above referenced published US patent application US-A-2013/0318270, which is incorporated herein in its entirety by reference (in particular the discussion of the operation and implementation of the weakly fair arbitration algorithm described).

FIG. 4 schematically illustrates a second example embodiment of an arbitrating and multiplexing circuitry 94. In this example, only a portion of the circuitry is illustrated following one example signal path. The arbitrating and multiplexing circuitry 94 in this example receives 128 inputs and uses radix two arbiters and multiplexers at each of the arbitrating levels and multiplexing levels. As illustrated in FIG. 4, the critical path depth through the arbitrating and multiplexing circuitry 94 is equivalent to the time to pass through one arbiter and eight logic gates.

FIG. 5 schematically illustrates a third example embodiment of arbitrating and multiplexing circuitry 96. Again, an example signal path is illustrated rather than the entirety of the arbitrating and multiplexing circuitry 96. In this example there are 128 ways corresponding to the number of inputs between which arbitration and selection is to be performed. All but the final level of arbitration utilises 4-way arbiters. The final level of arbitration uses a 2-way arbiter. The final multiplexer is an 8-way multiplexer.

FIG. 6 schematically illustrates the operation of the arbitrating and multiplexing circuitry 28, 94, 96 of the embodiments of FIGS. 3, 4 and 5. At step 98 a plurality of active signals and inputs are received between which arbitration and selection is to be performed. At step 100 the first set of multiplexing levels within the multiplexing tree circuitry serves to select amongst the inputs to perform a partial selection. A parallel full arbitration is performed in step 102. These selections as performed by the first set of multiplexing levels are driven (controlled) by intermediate switching signals received from the parallel operation of the arbitrating tree circuitry performed at step 102. These intermediate switching signals, as they become available, serve to switch their associated multiplexers.

When the arbitration tree circuitry has completed its operation and the arbitration is complete, then a final switching signal is supplied to the second set of multiplexing levels which performs its final selection at step 104 to provide the output and complete the selection operation. The result of the full arbitration finished at the end of step 102 also results in the generation of an arbitration result in the form of a one-hot signal indicating which of the inputs was selected by the arbitration.

FIG. 7 is a diagram schematically illustrating the progress of the arbitration and the selection performed by the example embodiment of FIG. 3. The arbitration proceeds until four levels of selection have been performed corresponding to the four arbitrating levels. After the first of these levels of arbitration has been completed, then the selection by the multiplexing levels of the first set of multiplexing levels will start, as driven by the now available intermediate switching signals. The speed of operation of the first set of multiplexing levels and the arbitrating tree circuitry including all levels, is balanced such that these complete the full arbitration and the partial selection at approximately the same time. Thus, when the final switching signal(s) becomes available following completion of the arbitration, and in dependence upon the arbitration, then the final switching signal(s) may be used to control the selection by the second set of multiplexing levels, namely the final multiplexer 66 which performs a radix four selection corresponding to two levels of selection in one go relative to the radix two levels selection performed in parallel with operation of the arbitration tree circuitry by the first set of multiplexing levels.

The arbitrating and multiplexing circuitry described above may, for example, be used as part of a network-on-chip integrated circuit or within interconnect circuitry of a system-on-chip integrated circuit.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

We claim:

1. Arbitrating and multiplexing circuitry for performing an arbitration between a plurality of inputs and a selection of at least one of said plurality of inputs to provide an output, said arbitrating and multiplexing circuitry comprising:
    arbitrating tree circuitry having X arbitrating levels, where X is an integer greater than one; and
    multiplexing tree circuitry having Y multiplexing levels, where Y is an integer greater than one; wherein
        (i) said Y multiplexing levels comprise a first set of said multiplexing levels upstream of a second set of said multiplexing levels;
        (ii) said first set of said multiplexing levels is configured to operate in parallel with at least some of said X arbitrating levels, whereby said first set of multiplexing levels is configured to perform a partial selection in parallel with said arbitration performed by said X arbitrating levels; and
        (iii) said second set of said multiplexing levels is configured to operate in series with said X arbitrating levels, whereby said second set of multiplexing levels completes said selection to provide said output following completion of and in dependence upon said arbitration.

2. Arbitrating and multiplexing circuitry as claimed in claim 1, wherein Y is less than or equal to X.

3. Arbitrating and multiplexing circuitry as claimed in claim 2, wherein the first set of multiplexing levels has a number of levels that is the smallest integer greater than or equal to X/2.

4. Arbitrating and multiplexing circuitry as claimed in claim 1, wherein said second set of multiplexing levels comprises a single multiplexing level.

5. Arbitrating and multiplexing circuitry as claimed in claim 4, wherein said single multiplexing level comprises a final multiplexer switched by a final switching signal generated upon said completion of said arbitration.

6. Arbitrating and multiplexing circuitry as claimed in claim 5, wherein said final multiplexer is an P-way multiplexer.

7. Arbitrating and multiplexing circuitry as claimed in claim 6, wherein each level within said first set of multiplexing levels comprises a plurality of Q-way multiplexers.

8. Arbitrating and multiplexing circuitry as claimed in claim 7, wherein each of said plurality of Q-way multiplexers is switched by a respective intermediate switching signal generated prior to said completion of said arbitration.

9. Arbitrating and multiplexing circuitry as claimed in claim 7, wherein each level within said X arbitrating levels comprises a plurality of Q-way arbiters.

10. Arbitrating and multiplexing circuitry as claimed in claim 8, wherein each level within said X arbitrating levels comprises a plurality of Q-way arbiters and within one or more levels of said X arbitrating levels, each of said plurality of Q-way arbiters is associated with a respective Q-way multiplexer and generates an intermediate switching signal for said respective Q-way multiplexer.

11. Arbitrating and multiplexing circuitry as claimed in claim 7, wherein $Q=2^R$, where R is an integer greater than zero.

12. Arbitrating and multiplexing circuitry as claimed in claim 11, wherein R is two.

13. Arbitrating and multiplexing circuitry as claimed in claim 11, wherein each of said Q-way multiplexers has a logic depth corresponding to one AND gate and R OR gates.

14. Arbitrating and multiplexing circuitry as claimed in claim 6, wherein said P-way multiplexer has a logic depth corresponding to one AND gate and S OR gates, where S is equal to $\log_2(P)$.

15. Arbitrating and multiplexing circuitry as claimed in claim 1, wherein each of said plurality of inputs has a corresponding one of a plurality of active signals indicating whether a respective one of said plurality of inputs is to be subject to said arbitration and said arbitrating tree circuitry fully performs said arbitration in direct dependence upon said plurality of active signals.

16. Arbitrating and multiplexing circuitry as claimed in claim 1, wherein said arbitration is performed based upon one of:
    a pseudo least recently used algorithm;
    a least recently used algorithm;
    a fair arbitration algorithm; and
    a random algorithm.

17. Arbitrating and multiplexing circuitry as claimed in claim 1, wherein said arbitrating tree circuitry is configured to generate an arbitration result signal upon said completion of said arbitration, said arbitration result signal indicating which of said plurality of inputs was selected to provide said output by said multiplexing tree circuitry.

18. Arbitrating and multiplexing circuitry as claimed in claim 1, wherein said arbitrating and multiplexing circuitry is part of one of:
   a network-on-chip integrated circuit; and
   interconnect circuitry of a system-on-chip integrated circuit.

19. A method of arbitrating and multiplexing to perform an arbitration between a plurality of inputs and a selection of at least one of said plurality of inputs to provide an output, said method comprising the steps of:
   performing said arbitration with arbitration tree circuitry, said arbitrating tree circuitry having X arbitrating levels, where X is an integer greater than one; and
   performing said selection with multiplexing tree circuitry, said multiplexing tree circuitry having Y multiplexing levels, where Y is an integer greater than one; wherein
   (i) said Y multiplexing levels comprise a first set of said multiplexing levels upstream of a second set of said multiplexing levels;
   (ii) said first set of said multiplexing levels operates in parallel with at least some of said X arbitrating levels, whereby said first set of multiplexing levels performs a partial selection in parallel with said arbitration performed by said X arbitrating levels; and
   (iii) said second set of said multiplexing levels operates in series with said X arbitrating levels, whereby said second set of multiplexing levels completes said selection to provide said output following completion of and in dependence upon said arbitration.

\* \* \* \* \*